Oct. 23, 1923.
W. H. LEISTER
1,471,616
CORN HUSKING MACHINE
Filed July 18, 1918    9 Sheets-Sheet 4
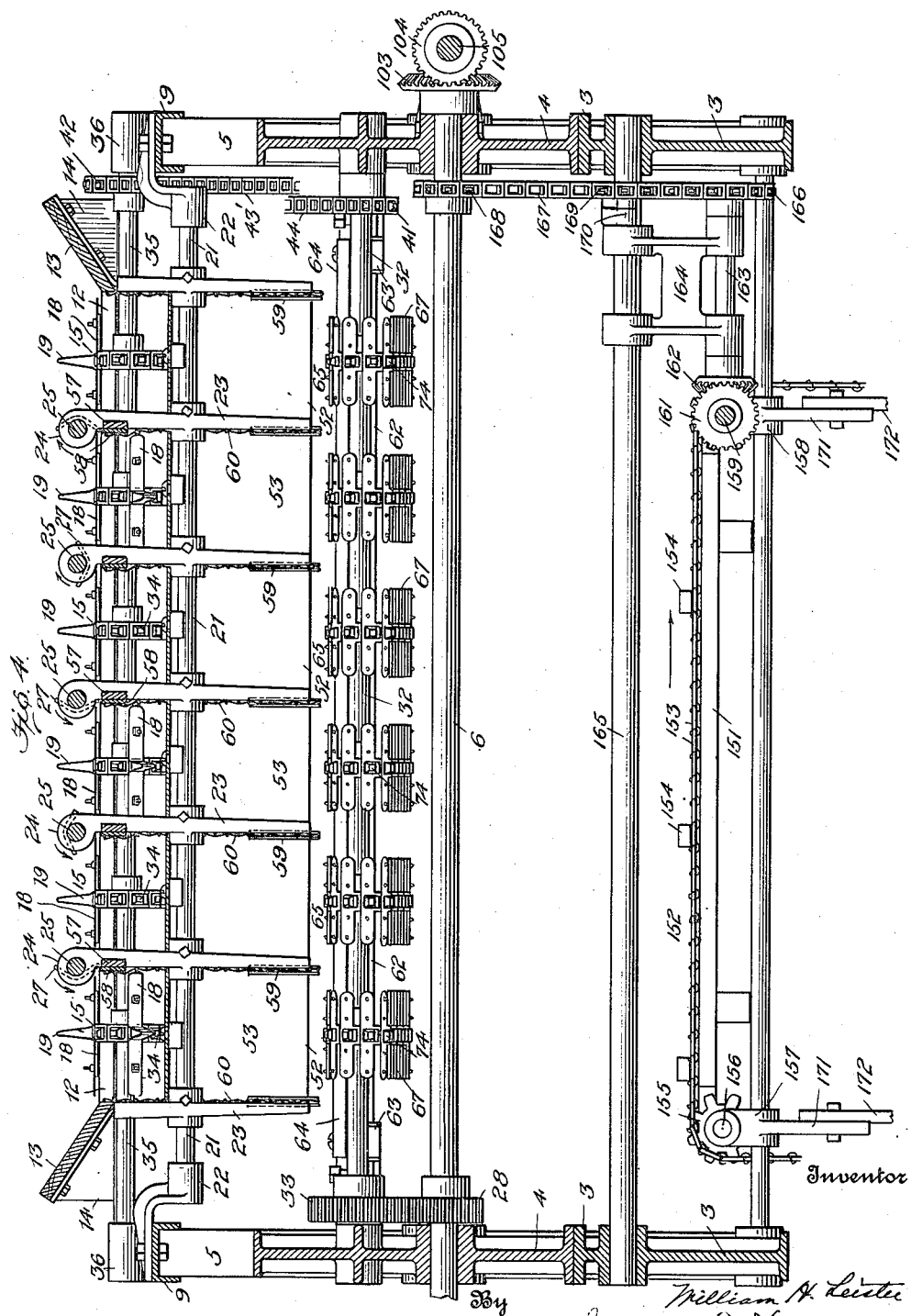

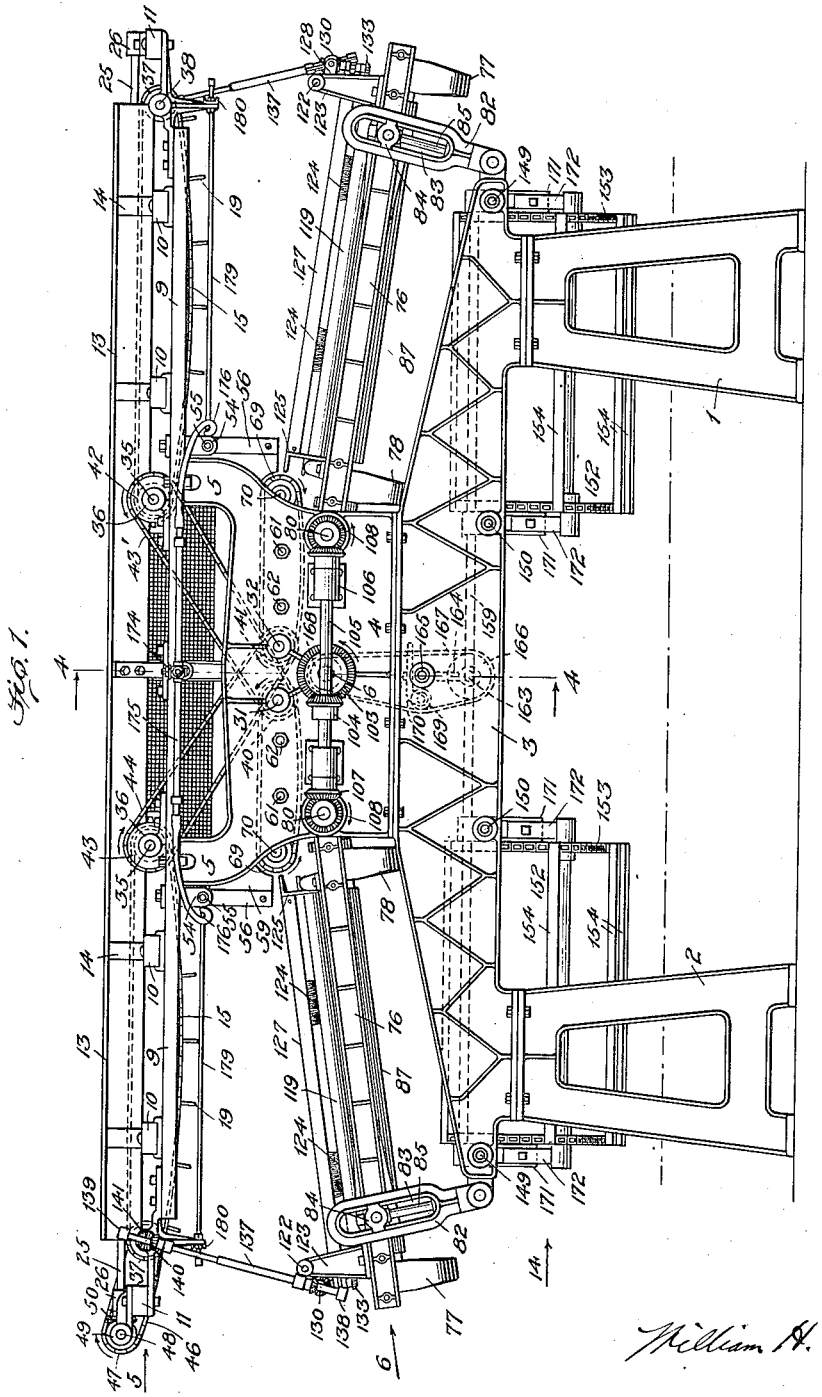

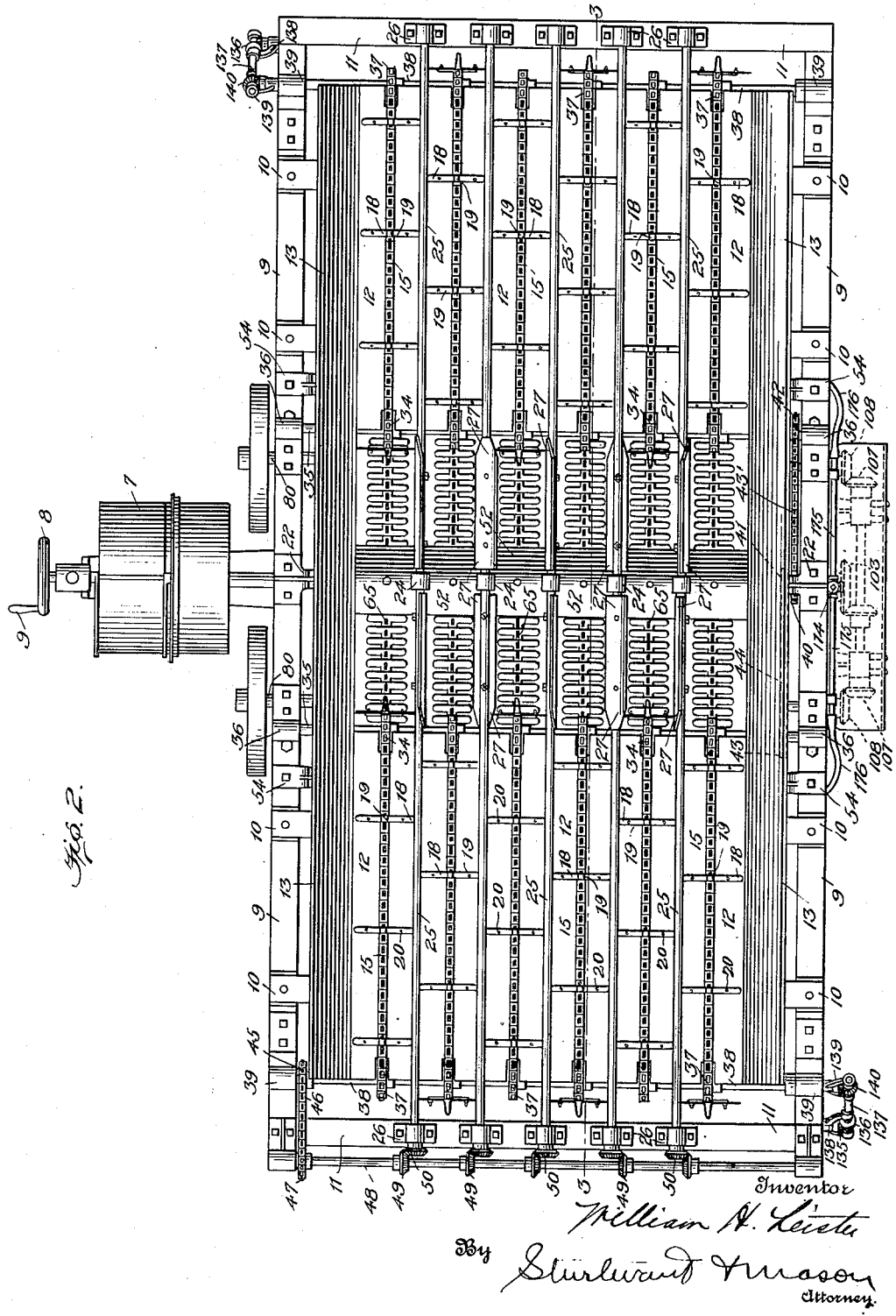

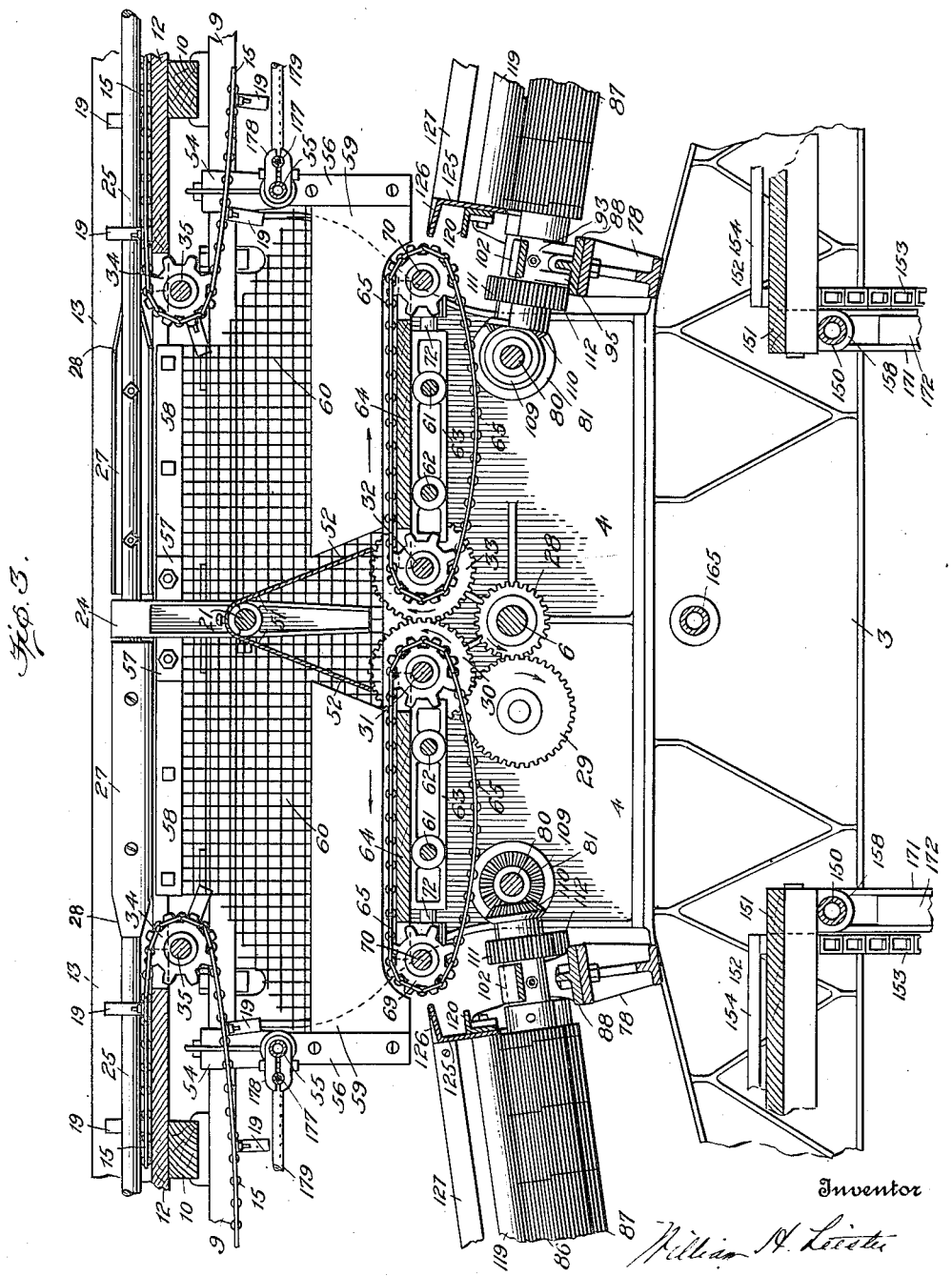

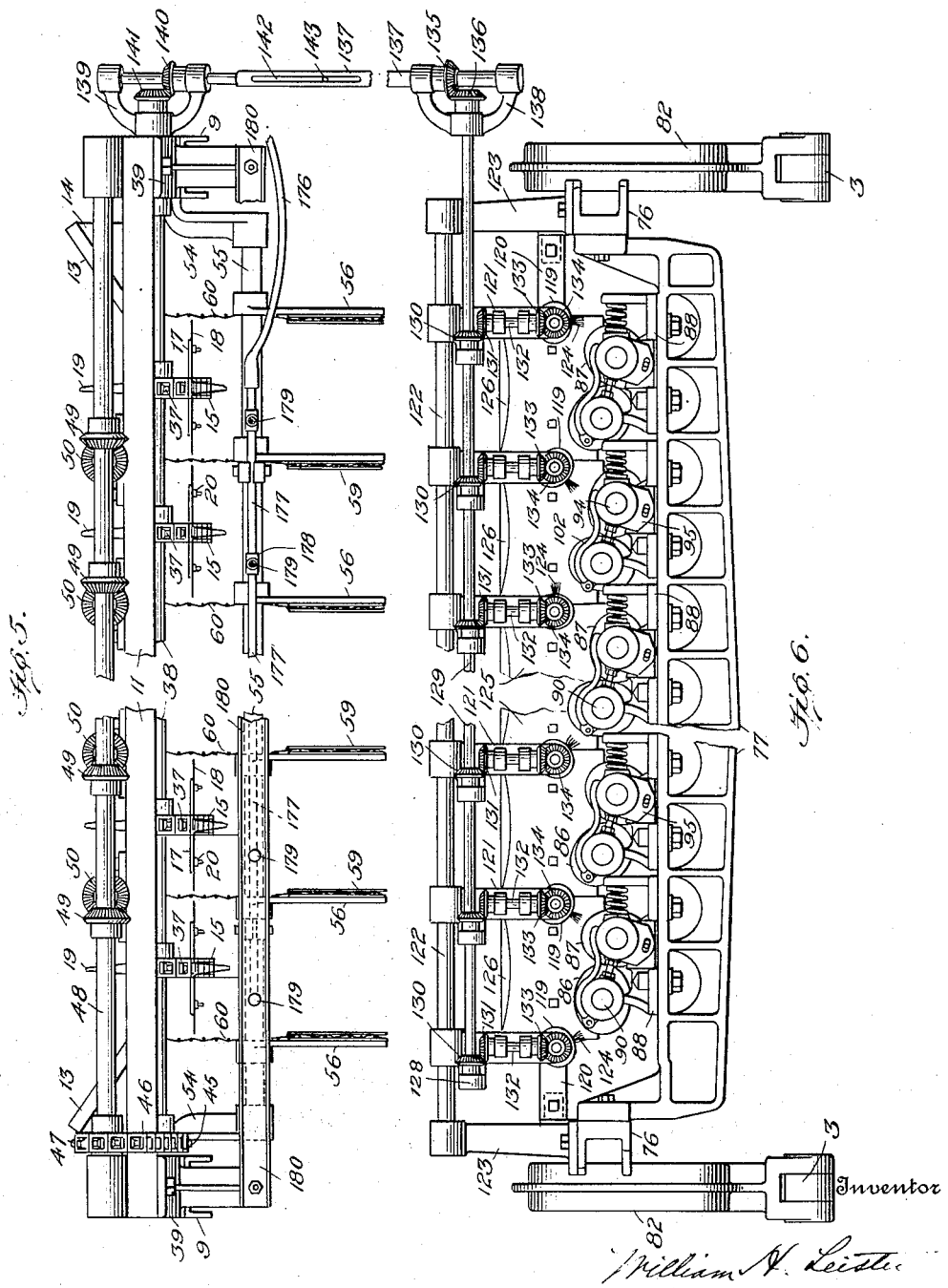

Oct. 23, 1923.  
W. H. LEISTER  
1,471,616  
CORN HUSKING MACHINE  
Filed July 18, 1918  
9 Sheets-Sheet 6
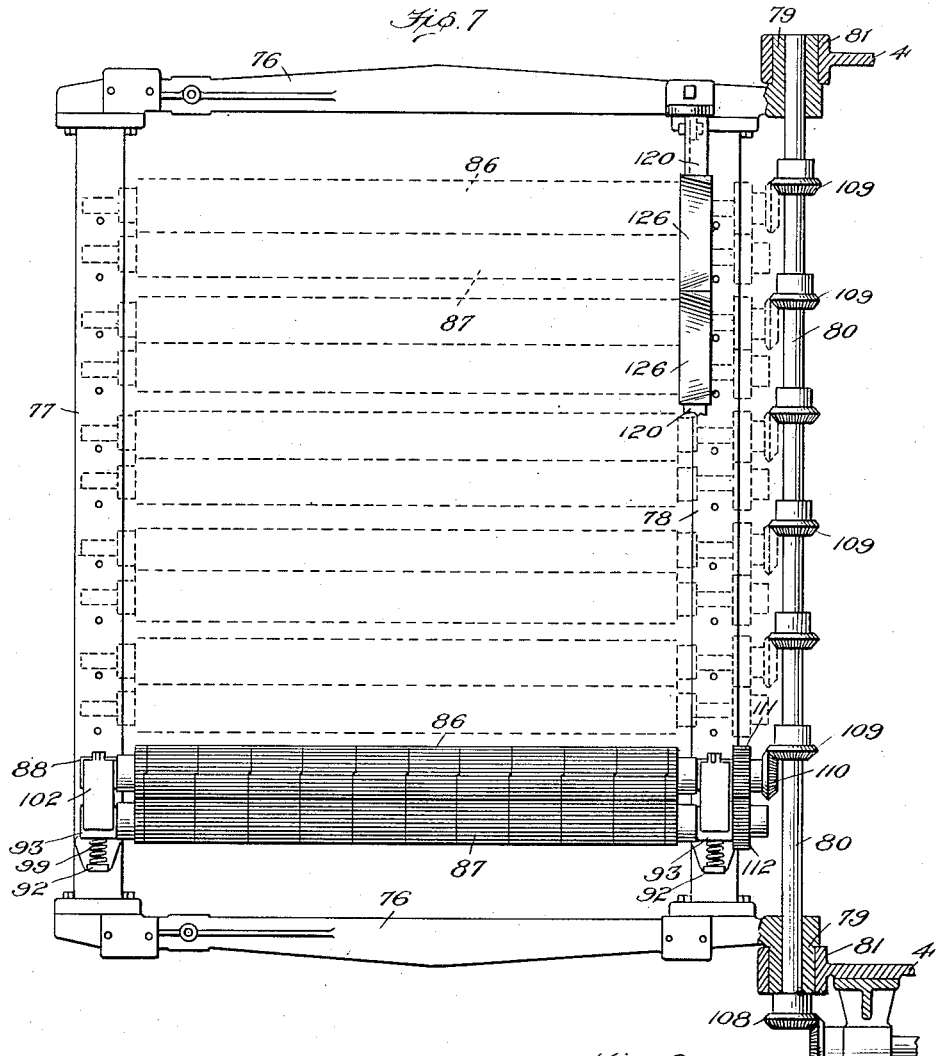
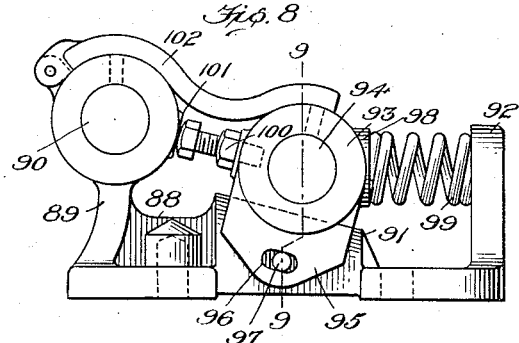
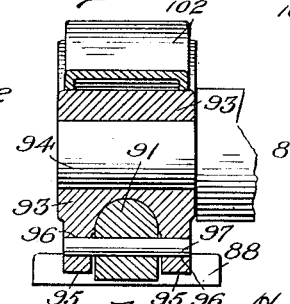
Inventor  
William H. Leister  
By Sturtevant & Mason  
Attorneys Oct. 23, 1923.
W. H. LEISTER
1,471,616
CORN HUSKING MACHINE
Filed July 18, 1918
9 Sheets-Sheet 7
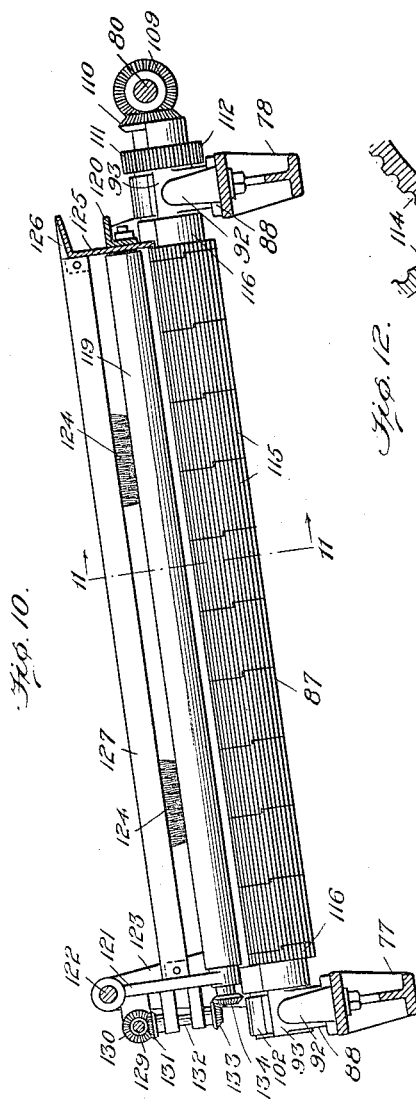
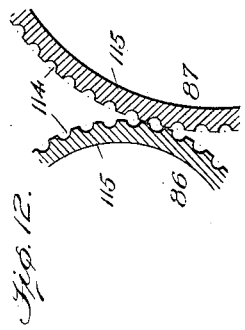
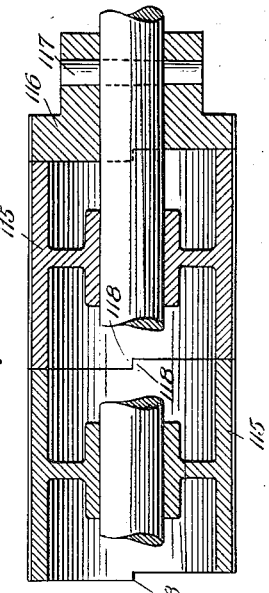
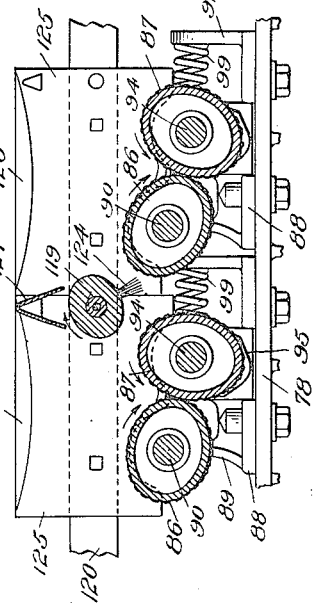
Inventor
William H. Leister
By Sturtevant & Mason
Attorneys Oct. 23, 1923.                    W. H. LEISTER                    1,471,616
CORN HUSKING MACHINE
Filed July 18, 1918                    9 Sheets-Sheet 8
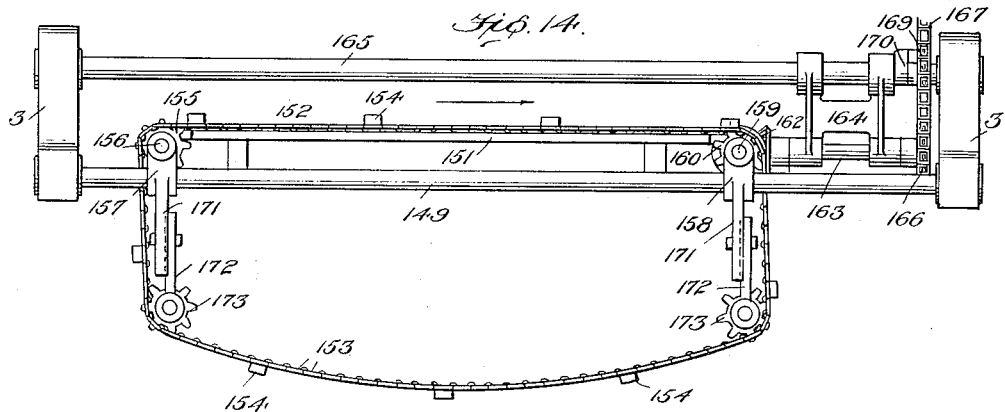
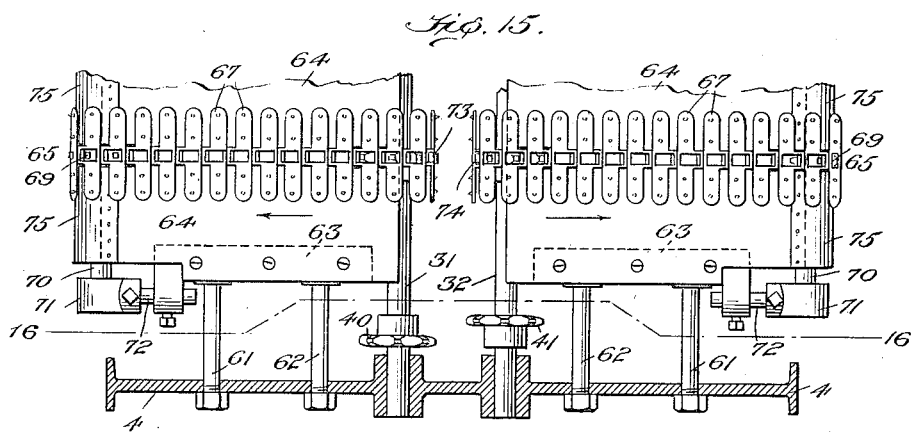
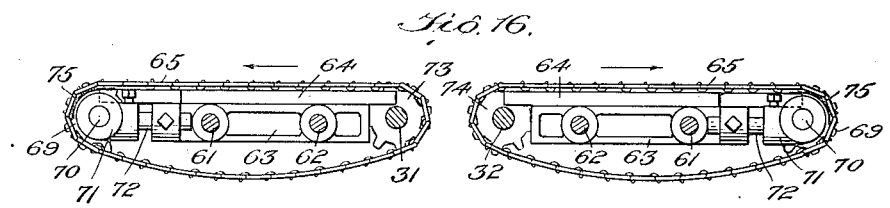
Inventor
William H. Leister
By Sturtivant & Mason
Attorneys Oct. 23, 1923.
W. H. LEISTER
1,471,616
CORN HUSKING MACHINE
Filed July 18, 1918    9 Sheets-Sheet 9
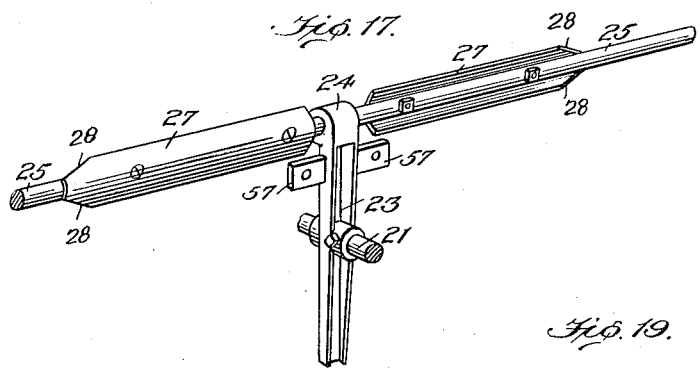
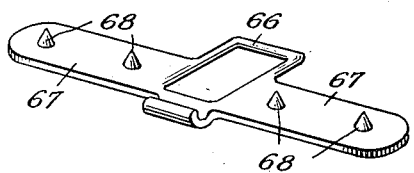
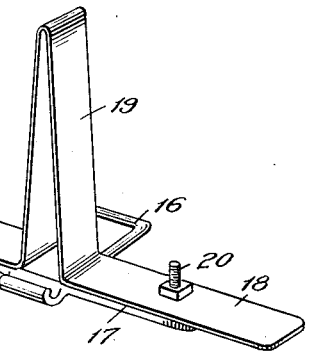
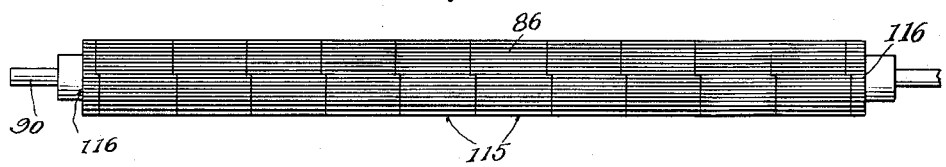
Inventor
William H. Leister
By Sturtevant & Mason
Attorneys Patented Oct. 23, 1923.

1,471,616

UNITED STATES PATENT OFFICE.

WILLIAM HAMMOND LEISTER, OF WESTMINSTER, MARYLAND, ASSIGNOR TO THE UNITED MACHINERY COMPANY, OF WESTMINSTER, MARYLAND, A CORPORATION OF MARYLAND.

CORN-HUSKING MACHINE.

Application filed July 18, 1918. Serial No. 245,500.

*To all whom it may concern:*

Be it known that I, WILLIAM HAMMOND LEISTER, a citizen of the United States, residing at Westminster, in the county of Carroll, State of Maryland, have invented certain new and useful Improvements in Corn-Husking Machines, of which the following is a description, reference being had to the accompanying drawing, and to the figures of reference marked thereon.

The invention relates to new and useful improvements in corn husking machines and more particularly to a corn husking machine adapted to remove the husks and silk from green corn.

An object of the invention is to provide a husking machine wherein ears of green corn may be placed indiscriminately on a supporting table and fed therefrom onto husking units with means for uniformly distributing the ears transversely of the feeding means which conveys the ears to the husking units.

A still further object of the invention is to provide a husking machine of the above character wherein an alining pocket is arranged between the table on which the ears are placed indiscriminately and the husking unit for receiving and delivering the same endwise to the husking unit.

A still further object of the inventon is to provide means for positively feeding the ears from the alining pockets onto the husking units and for retarding one end of each ear so as to cause the other end of the ear to be thrown downwardly toward the husking members to facilitate the grasping of the husks by the said husking members.

A still further object of the invention is to provide co-operating devices at the mouth of each alining pocket which assists in arranging the ears endwise as they fall into the alining pockets.

A still further object of the invention is to provide a machine of the above character wherein the husking unit is so constructed as to cause a tumbling of the ear as it is being husked whereby slow clogging of the husking rolls is prevented and whereby the efficiency of the husking members is greatly increased.

These and other objects will in part be obvious and will in part be hereinafter more fully described.

In the drawings:—

Figure 1 is a side elevation of a husking machine embodying the improvements of the invention;

Fig. 2 is a top plan view of Figure 1, illustrating particularly and in plan the combined ear feeding and alining for advancing the ears of corn to the alining pockets;

Fig. 3 is a fragmentary vertical longitudinal sectional eleveation of the machine taken on the line 3—3 of Figure 2;

Fig. 4 is a transverse vertical sectional elevation taken on the line 4—4 of Figure 1;

Fig. 5 is a fragmentary end elevation of the upper portion of the machine looking in the direction of the arrow 5 of Figure 1, with a portion of the frame, in the right-hand section of the figure broken away, to illustrate the construction of interior parts hereafter described in detail;

Fig. 6 is a fragmentary end elevation of the intermediate portion of the machine looking in the direction of the arrow 6 of Figure 1;

Fig. 7 is a plan view of the husking machine, illustrating one of the husking units and a portion of the retarding means at the receiving end in elevation and the remainder of the husking units in dotted lines;

Fig. 8 is an end elevation of one of the husking units illustrating in detail the bearing construction;

Fig. 9 is a vertical sectional elevation on the line 9—9 of Figure 8;

Fig. 10 is a side elevation of one of the husking units and co-operating parts;

Fig. 11 is a vertical sectional elevation on the line 11—11 of Figure 10;

Fig. 12 is an enlarged fragmentary vertical section taken through the peripheral portions of one pair of husking rolls;

Fig. 13 is an enlarged fragmentary longitudinal sectional elevation of a husking roll;

Fig. 14 is an end elevation of the lower portion of the machine looking in the direction of the arrow 14 of Figure 1;

Fig. 15 is a fragmentary plan view showing one of the chains or belts for advancing ears in endwise position from the alining pockets to the husking mechanism;

Fig. 16 is a vertical sectional elevation on the line 16—16 of Figure 15;

Fig. 17 is a detail view in perspective of one member of the alining means located adjacent the mouths of the alining pockets;

Fig. 18 is a perspective view of a preferred form of plate member or link employed in the construction of the chains illustrated in Figures 15 and 16;

Fig. 19 is a perspective view illustrating one of the projecting ear engaging fingers of the feeding mechanism for advancing ears to the alining pockets;

Fig. 20 is a longitudinal elevation of one of the rolls.

*General organization of the machine.*

The husking machine adopted for illustrating the improvements of the invention is of the duplex type, and, as viewed in Figures 1 and 3, said machine is composed of right and left hand sections, each section of the machine comprising, in its general organization, a husking mechanism embodying a plurality of husking units, a plurality of alining pockets from which ears of corn are fed to the husking units in endwise position, and a combined ear feeding and alining mechanism for advancing the ears to and depositing them in endwise position in said pockets. In a duplex machine of this type, ears of corn are deposited indiscriminately at the opposite ends of the machine on the respective right and left hand combined ear feeding and alining mechanism, are advanced in opposite directions towards the center of the machine by the feeding mechanisms and are deposited in the alining pockets of the right and left hand sections which are located at the central portion of the machine. From the alining pockets of the respective sections, the ears are fed in opposite directions towards the opposite ends of the machine to the right and left hand husking mechanisms where the husks and silk, are stripped from the ears. Each husking mechanism is provided with suitable conveying means for carrying away the husks and silk and the husked ears are discharged from the husking mechanisms at the opposite ends of the machine. Although a husking machine of the duplex type is obviously advantageous from a standpoint of machine design, in that it combines an exceedingly compact construction with a maximum output per machine, the invention is not necessarily limited to a machine of this type.

The various mechanisms of the right and left hand sections of the duplex machine illustrated are substantially similar in construction and mode of operation. Hence, for convenience, the ensuing description will be confined to and the same character of reference will be employed to designate such parts of one section as are duplicated in the other section.

The main frame of the machine is conveniently constructed as follows: At each end of the machine is a pair of right and left hand pedestals designated respectively by the reference characters 1 and 2, as viewed in Figure 1, and the pedestals 1 and 2 on each side of the machine mutually support longitudinal beams 3 which are rigidly secured by bolts on the pedestals. Suitably secured by bolts to the beams 3, intermediate the ends thereof, and at each side of the machine is a frame plate 4 provided at its opposite ends with upstanding vertical extensions 5. The above described construction provides an exceedingly simple and strong framework by which all the parts and mechanisms of the machine are supported in the manner which will appear hereinafter.

A tranverse power shaft 6 is journaled in the two frame plates 4, as shown in Figures 3 and 4, and power is derived from this shaft by suitable connections for operating the various mechanisms embodied in the machine. At the end, the power shaft 6 may be provided with a clutch 7 of the belt shifting type operated by a hand-wheel 8, as shown in Figure 2, whereby all the mechanisms of the machine may be started and stopped simultaneously. The clutch 7 may obviously be constructed in any preferred manner well known in the art, and, therefore, a detailed description of the clutch construction will not be given.

*The combined ear feeding and alining mechanisms.*

The novel combined ear feeding and alining mechanism of this invention is for the purpose of receiving the unhusked ears fed to the machine in bulk or in an indiscriminate mass, and advancing the ears to and depositing them arranged in substantial alinement, or in endwise position in the ear alining pockets. A distinct advantage of this novel arrangement lies in the fact that the ears may be deposited in the machine at the receiving end thereof in bulk, and the ears are arranged in substantial alinement before they are delivered to the alining pockets. This dispenses altogether with feeding devices which require manual deposit of the ears one-by-one at the receiving end of the mechanism, and increases the capacity of the machine, while rendering unnecessary the employment of an operator for feeding the ears. For supporting the combined mechanism, a framework may be constructed as follows: Mounted upon the vertical extensions 5 of the side plates 4 are longitudinal bars 9 (Figures 1 and 2) which extend substantially the entire length of the machine and are braced at intervals by inner transverse bars 10 and also by end bars 11, as shown particularly in Figure 2. On this framework is supported at each end of the machine a substantially horizontal table 12, which extends from the outer receiving end of the machine to the point where the ears of corn fall into the centrally located alining pockets. As shown, the table 12 is nearly as wide as the machine and the outer longitudinal edges thereof meet the lower edges of inclined side walls 13, formed of bars extending longitudinally of the machine and supported by suitable brackets 14 in-reaching from the longitudinal bars 9 of the upper frame. The inclined side walls prevent ears of corn from falling off the sides of the table 12 during the feeding of the ears.

According to the invention, the combined feeding and alining mechanism comprises primary features which may be stated as follows: Feeding means for advancing the ears to the alining pockets; means for alining the ears so arranging them in endwise position during the feed thereof; and means for distributing the ears transversely over the feeding means. The last mentioned means is not only effective to distribute the mass of ears transversely over the table 12 but also greatly assists in alining the ears by causing misplaced ears to move in the path of elements of the alining mechanism.

In the present embodiment, the feeding means is combined structurally with the alining means, as will appear from the following description. Movable longitudinally over the table 12 from the outer to the inner edge thereof, are the upper reaches of a plurality of parallel conveyor belts or feed chains 15, the chains being advanced in unison, as will hereinafter appear, and producing the effect of a continuously moving surface on which the ears of corn may be deposited and carried to the pockets. All the chains may be alike in construction; each chain is composed of a suitable number of plain flat links and also includes in its construction a plurality of specially formed links 16 (see Figure 19) spaced at intervals along the chain and connected to the adjacent ends of plain link sections, in the manner shown in Figure 2. The links 16 are each provided with opposite transverse extensions or plates 17 and secured to these extensions 17 are the horizontal wings 18 of a metallic strip suitably bent at the inner extremities of the horizontal wings to form a vertical ear engaging member or alining finger 19. Preferably, each wing 18 is secured to its corresponding extension or plate 17 by means of a bolt and nut 20, the bolts projecting some distance from the plane of the wing to form an ear engaging lug. Constructed in this manner, the several feed chains are each provided with spaced ear engaging and separating fingers 19 and lateral wings 18 having lugs 20 disposed on opposite sides of the fingers. By referring to Figure 2, it will be noted that the fingers of one feed chain are positioned intermediate the corresponding fingers of the adjacent chain, and as a result of this arrangement, the several chains will carry over the table 12 a plurality of spaced vertical projections disposed diagonally with reference to the direction of progression of the chains.

In order to effect distribution of the ears transversely over the moving feed chains, there is provided means interposed between the adjacent chains for imparting an impetus to ears of corn transversely of the moving chains. A transverse supporting bar 21 is mounted at its opposite ends in bearing brackets 22 supported by the side bars 9. Mounted at intervals along said bar 21 are fixed vertical arms 23, all except the outer two of which are provided with bearings 24 located above the plane of the table 12, as shown more particularly in Figure 4. Journaled for rotation in the several bearings 24 and extending practically the full length of the upper portion of the machine are shafts 25. The outer ends of said shafts are journaled in bearings 26 mounted on the transverse end bars 11 of the upper frame, as shown in figure 2. These shafts 25 extend parallel with and are located between adjacent feed chains and form moving or rotating partitions separating the chains from each other. The shafts are rotated constantly on their individual axes in directions away from the longitudinal center of the table 12, shafts on one side of the center of the table being rotated oppositely to the shafts on the opposite sides of the center as indicated by the arrows in Figure 4.

In operation, the ears of corn are deposited indiscriminately on the table 12 at the receiving end thereof. The longitudinally moving chains 15 advance the mass of ears toward the discharge end of the table. As the ears come into engagement with the constantly rotating shafts 25 they are shifted transversely of the chains, the mass of advancing ears being distributed from the center of the table evenly over the entire surface of the table by the combined longitudinal motion of the chains and lateral motion of the shafts. During their advance, the ears are engaged and separated from each other by the diagonally arranged vertical fingers 19 of the chains, which engagements tends to swing ears arranged transversely of the table around into endwise position, wherein the ears are engaged by the lugs 20 on the lateral wings 18, the lugs holding the ears in endwise position as they are carried forward. This swinging action will be assisted by the lateral movement imparted to ears by the shafts 25, since the latter tend to move the extreme ends of the ears into the path of the vertical fingers 19 of the chains whereupon engagement of the ears with said vertical extensions is effected off the center of the ears with the result that the latter are swung into endwise position between the shafts and carried forward in such position by the engaging lugs 20. By arranging the fingers of the one chain diagonally with relation to the fingers of an adjacent chain, only one finger can engage a transversely positioned ear at a time, and hence the tendency of the fingers, as they engage the ears, is to swing the ears around into endwise position substantially parallel with the line of motion of the chains and not to arrange the ears in transverse position during their advance by the feed chains to the point of discharge. The above described functions are very effective for distributing, separating and arranging in endwise position, ears of corn deposited indiscriminately on the table, the distribution and alinement of the ears being effected while the entire mass moves continuously to the inner end of the table where the ears arranged substantially in endwise position are discharged into the alining pockets. Preferably, the several lateral wings 18 of the chains extend beneath the revolving shafts 25 serving as partitions and, as they move under the shafts, the wings serve to keep the shafts from becoming entangled with stray husks and other foreign substances.

As above stated, the combined feeding and alining mechanism is very efficient for delivering the ears in endwise position to the alining pockets, but, in order to prevent with practical certainty ears arranged in transverse or other misplaced position, from falling into the alining pockets, additional alining means located adjacent the mouths of the pockets is provided, which alining means is adapted to engage ears that may be misplaced and turn them into alinement before they are permitted to fall into the pockets. For this purpose, the portions of the shafts 25 which extend over the pockets are provided with longitudinal curved blades 27 adapted to engage the ears before they fall into the pockets and swing them around into endwise position. The ends of the blades facing the discharge ends of the chains 15 are preferably beveled, as shown, at 28, with the result that the longitudinal edges of the blades converge at one end toward the peripheries of the shafts 25. The several blades are also preferably arranged on their respective shafts so as to occupy different positions with relation to each other. Because of this arrangement, a sort of an irregular vibrating top is provided over the alining pockets, having long narrow passages through which ears can pass to the pockets below.

It will readily be seen that, if ears are thrown promiscuously onto these rotating alining blades which operate in staggered relation to each other, the ears which rest directly on the blades and extend across the same will be either moved endwise or tilted so as to drop more or less end first into the pockets and, of course, ears which are parallel with the blades pass between the blades and into the pockets. In other words, these alining devices assure that the ears, no matter how they may be arranged when placed thereon, will not clog but will be separated by the vibratory action of these blades on the mass of ears so that all of the ears will pass down into the pockets.

The following drive connections may be employed for the feed chains 15 and the longitudinal shafts 25. As shown in Figure 3, the main power shaft 6 is provided with a gear 28 which meshes with a gear 29 journaled on a stub axle projecting inwardly from one of the upper frame plates 4. Gear 29 in turn meshes with a gear 30 fixed to a transverse shaft 31 journaled in the two frame plates 4. Parallel with the shaft 31 is a second shaft 32 also journaled in the two upper frame plates and provided with a gear 33, which meshes with the gear 30 of the shaft 31. In the present machine, power shaft 6 is driven counter-clockwise and the train of gearing between said power shaft and the two transverse shafts 31—32 drives shaft 31 counter-clockwise and shaft 32 clockwise, as viewed in Figure 3. At their discharge ends, the feed chains 15 pass over sprockets 34 fixed to a transverse shaft 35 journaled in brackets 36 which are supported by the side bars 9; the receiving ends of the feed chains pass over sprockets 37 fixed to a transverse shaft 38 located in front of the table 12, and journaled in brackets 39 also supported by the side bars 9. As shown in Figure 15 and in dotted lines in Figure 1, shafts 31, 32, are respectively provided with sprockets 40, 41. The inner shafts 35 of the feed chains of the right and left hand sections of the machine are provided respectively, with drive sprockets 42—43 (see Figure 1) which are connected by chains 43—44 with the sprockets 40—41 of the shafts 31—32. Accordingly the feed chains 15 of the left hand section are driven by power derived from shaft 32 and the feed chains 15 of the right hand section are driven by power derived from shaft 31, the parts moving in the direction of the arrows of Figure 1, to advance the feed chains of the opposite sections of the machine towards each other to the centrally alining pockets.

The outer shaft 38 of the left hand section of the machine is provided with a sprocket 45 connected by a chain 46 with a sprocket 47 on a transverse shaft 48. Shaft 48 is journaled in bearings projecting forwardly from the side bars 9 and is provided with drive pinions 49 in mesh with drive pinions 50, the latter being fixed to the ends of the several longitudinal shafts 25. As shown in Figures 2 and 5, the pinions 49 on one side of the longitudinal center of the table mesh with co-acting pinions 50 oppositely to the pinion 49 on the other side of the longitudinal center, whereby the shafts 25 on one side of the longitudinal center are driven oppositely to the shafts on the other side. All the shafts 25 revolve outwardly, at their upper surfaces from the center of the table, as hereinbefore stated.

*The alining pockets.*

The alining pockets constitute another feature of the invention and form an important adjunct to the combined feeding and alining mechanism above described, in ensuring delivery of the ears properly arranged in endwise position to the husking mechanism. The pockets are arranged in a transverse row between the side plates 4 of the main frame in position for receiving and keeping separate ears discharged by the feed chains 15, there being a pocket located at the discharge end of each feed chain. As hereinbefore indicated, a row of pockets is provided for each section of the machine; the row of pockets of the right hand section is separated from the row of the left hand section by means of a transverse partition 51 secured to and suspended from the transverse bar 21, as shown in Figures 3 and 4, and provided with oppositely and downwardly inclined parting walls 52. The transverse partition functions as a deflector for guiding ears as they fall between the rotating plates 27 into the two rows of alining pockets.

In the drawings, the alining pockets of each row are designated by the reference character 53, and, referring to Figure 4, it will be noted that the pockets are located between the vertical arms 23 on the transverse bar 21.

The pockets are separated from each other by longitudinal partitions constructed as follows: Secured to the side bars 9 of the upper frame are supporting brackets 54 in which are mounted the opposite ends of a transverse supporting bar 55 (see particularly Figure 5). Suspended from the bar 55 are vertical bars 56, the several bars 56 being located in front of and substantially in line with the vertical arms 23. With the exception of the two outer arms 23, as viewed in Figure 4, the arms 23 are respectively provided with longitudinal wings or extensions 57 to which are secured the upper longitudinal bars 58 of the several inner partitions. The upper edges of these bars 58 are located just beneath the agitating plates 27, and, thus, the bars 58 serve to strip the plate 27 from any stray husks and any other foreign matter which adheres thereto, in the operation of the machine. Inwardly extending longitudinal plates 59 are supported by the vertical bars 56, the plates 59 terminating just in front of the inclined parting walls 52. As shown in Figure 3, the several plates 59, and upper longitudinal bars 58 are connected by sheets 60 of wire cloth. The outer edges of the sheets 60 are secured to the vertical bars 56 and the center of the sheets may be secured to the vertical arm 23. The two outer sheets of wire cloth are secured at their upper edges directly to the side walls 13, (see Figure 4). It will be noted that the pockets are elongated longitudinally and are relatively narrow in width, so that they keep the ears discharged from the feed chains arranged in endwise position.

The invention provides means for advancing the ears in endwise position from the pockets to the husking mechanisms, said means being constructed as follows: Extending between and secured to the side plates 4 are longitudinally spaced supporting bars 61, 62, on which are arranged longitudinal horizontal supporting frames 63, located respectively adjacent the opposite ends of the bars 61, 62 (see Figures 3, 15 and 16). These frames 63 support a transversely extending horizontal table 64, which forms the bottom of the transverse row of pockets 53. Movable longitudinally of the machine over the surface of the table 64 are endless conveyor chains 65, there being a chain for each pocket located between the separating partitions thereof. The upper operative reaches of the several chains 65 are advanced towards the outer end of the machine, as indicated by the arrows, and ears deposited in the pockets fall in end wise position on the chains 65 which advance the ears to and deposit them in endwise position on the husking units at the receiving ends of the latter. By endwise position of the ears on the husking units, I mean with the horizontal axis of the ear parallel with the rotatable axes of the husking units.

For insuring a positive delivery of the ears, each chain is preferably constructed of links of the type shown in Figure 18. Each link 66 is provided with lateral oppositely-extending wings 67 and projecting from the surface of the wings are studs 68 preferably conical in form, and having pointed ends, as shown. The studs penetrate the husks of the ears as they fall on the chains and keep the ears from rolling off the chains or moving out of alinement during the advance of the husking units.

At their front discharging ends, the chains 65 pass around idler sprockets 69 mounted on a transverse shaft 70 which is journaled at its opposite ends in bearing brackets 71 supported by the frames 63. The brackets 71 are adjustably mounted on rods 72 projecting from the frames 63, as shown in Figures 15 and 16, permitting the shaft 70 and idler sprockets to be shifted when it is desired to tighten up or loosen the chains. The rear ends of the chains of the left hand section of the machine pass over drive sprockets 73 fixed to the shaft 31, whereby the upper reaches of the chains are advanced in unison towards the husking units; the chains of the right hand section are similarly driven, but in the opposite direction by drive sprockets 74 mounted on the shaft 32. The forward transverse edge of the table 64 may be provided with a drownwardly curved plate 75 which guides the several chains over the idler sprockets, and also prevents ears from falling away between the chains as the ears are discharged. Plate 75 and the front edge of the table are suitably slotted to receive the sprocket 69; the rear drive sprockets are similarly received in slots extending from the inner edge of the table, as shown in Figure 15.

The husking mechanism.

The husking mechanism is especially constructed and arranged to strip the husks and silk from the ears with a maximum efficiency, and to practically eliminate clogging during the husking operation.

In the present embodiment, the husking mechanism consists of a plurality of husking units supported preferably by means of an inclined frame conveniently located beneath the combined feeding and alining mechanism hereinbefore described. The supporting frame for the husking units is substantially rectangular in form and comprises side or longitudinal bars 76 (see Figure 7) connected together at their outer and inner ends by outer and inner transverse trusses 77—78 lying in planes below the plane of the side bars, as shown in Figure 1. Mounted on the inner ends of the side bars 76 are bearing sleeves 79 in which is journaled the drive shaft 80 of the husking units. The bearing sleeves 79 are rotatably mounted in bearings 81 formed in the side plates 4 of the main frame. This construction allows the entire rectangular frame of the husking units to be raised and lowered about the axis of rotation of the drive shaft 80. Pivoted to the outer end of each beam 3 is a link 82 having a slot 83 adapted to receive a projection 84 pivoted to the side of bar 76 near the outer end thereof, as shown in Figure 1. The projections 84 of the bars 76 are slidably mounted in the slots 82 of the links and are supported by vertical posts 85 mounted in the slots 83. By adjusting the height of these vertical posts, the rectangular supporting frame may be raised or lowered, as desired. It is preferable, however, that the rectangular frame be supported in a position inclined downwardly toward the outer discharge end thereof.

The husking units correspond in number to the alining pockets 53 and are mounted in longitudinal position on the rectangular frame with their inner ends in position to receive ears of corn discharged by the conveyor chains 65. Each husking unit comprises a pair of husking elements or rolls inclined from their receiving to their discharge ends and extending parallel with the side bars 76. One of the rolls of each unit, i. e., the left hand roll 88, as viewed in Figure 6 lies in a plane above the other roll 87. At their opposite ends the rolls of each pair are journaled in bearings preferably constructed as follows: Mounted on the outer and inner transverse trusses 77, 78 are castings 88 (Figures 8 and 9). Each casting is formed with an upstanding bearing member 89 in which is journaled the longitudinal shaft 90 of the upper roll 86. The casting 88 is also formed with an intermediate ridge 91 and a vertical post 92. The bearing 93 for the concentric shaft 94 of the lower roll 87 is provided with depending extensions 95 adapted to embrace the ridge 91, as shown in Figure 9. Said extensions 95 are provided with elongated slots 96 which receive a pin 97 inserted through the ridge 91. Projecting laterally from one side of bearing 93 is a socketed member 98 supporting one end of a spring 99. The other end of the spring is supported in the vertical post 92. The spring functions to move bearing 93 towards bearing 89 and thereby to yieldingly press the peripheral surface of the lower roll towards the peripheral surface of the upper roll. An adjustable stop 100 projects laterally from the bearing 93 and is adapted to engage a stop 101 on bearing 89, the stop 100 limiting the movement of bearing 93 towards bearing 89 and also permitting adjustment of the relative positions of the peripheral surfaces of the two rolls 86—87. Pivoted on bearings 89 is a yoke 102, the free end of which normally rests on the upper surface of bearing 93 and serves to maintain bearing 93 in position. By lifting yoke 102 out of engagement with bearing 93 and removing pin 97, the lower roll 87 and its bearings may be readily lifted clear of the frame.

The rolls of each husking unit are driven in opposite directions and toward each other at their points of contact with the ears so as to grip and strip the husks and silk from ears deposited on the rolls. For this purpose the following drive connections may be employed. Mounted on one end of the main power shaft 6 is a gear 103 in mesh with a pinion 104 of a longitudinal shaft 105. Shaft 105 is journaled in bearings 106 projecting from side plate 4 of the main frame and is provided at its opposite ends with pinions 107 in mesh with pinion 108 fixed to the ends of the drive shafts 80 of the right and left hand husking mechanisms, as shown in Figure 1. It will be noted that the shafts of the right and left-hand husking mechanism are driven in opposite directions. Referring now to Figure 7, which illustrates the left-hand husking mechanism, drive shaft 80 is provided with pinions 109 in mesh with pinion 110 carried by the shafts 90 of the upper husking rolls of the several pairs. Each upper roll 86 is provided with a gear 111 in mesh with a gear 112 mounted on the shaft 94 of the lower roll 87. The drive connections for the right hand husking mechanism are similar to those above described.

In Figures 11 to 13 inclusive is illustrated a preferred construction of the husking rolls, whereby a shifting or tumbling of the ears during the husking operation is secured to prevent a slow clogging and to increase the husk stripping efficiency of the rolls. As shown therein the peripheral portion of each husking roll is made non-concentric throughout its entire extent, this being attained by making the peripheral portion substantially elliptical in shape. Each pair of elliptical rolls, constituting a husking unit, is so arranged that the husking surface of the major axis of one roll co-operates with the husking surface of the minor axis of the other roll. The several rolls are provided with peripheral longitudinal corrugations or grooves 114 for ensuring a positive grip of the husks, silk, etc., by the husking surface.

Each roll is constructed of a plurality of hollow elliptical sections 115 assembled one after the other on the central shaft, in the manner illustrated in Figure 13. The several sections are held against axial displacement by end heads 116 secured to the shaft by means of a pin 117. Shoulders 118 are formed on the adjacent edges of the several sections and heads, which shoulders are brought into engagement with each other, when the sections are assembled on the central shaft, and serve to prevent rotary displacement of the sections and heads relatively to each other. The sections and heads may be provided with grooves arranged to register when the sections and heads are in assembled position on the shaft.

These husking rolls per se are shown, described and claimed in my co-pending application Serial No. 192,366, filed September 20, 1917.

In the preferred embodiment of the invention, vibratory means is provided adapted to co-operate with each husking unit to increase the agitation imparted to the ears and also to assist in keeping the ears in alinement with the husking rolls. Co-extensive and substantially parallel with each pair of husking rolls is a vibratory member embodied in a relatively slowly rotating elliptical roll 119 (see Figures 10 and 11). The inner ends of the several rolls 119 are journaled in an inner transverse bar 120 supported by the side bars 76 of the rectangular frame in a plane above the husking rolls; the outer ends of said rolls 119 are journaled in depending arms 121 supported by a transverse bar 122, as shown in Figure 6. Bar 122 is supported above the plane of the rectangular frame by means of up-right brackets 123 mounted on the side bars 76. Referring to Figures 6 and 11, it will be noted that the rolls 119 with the exception of the roll at the extreme left of Figure 6, are supported above and a little to one side of the lower rolls 87 of the several husking units. The elliptical rolls 119 form vibrating partitions between the husking units and are so arranged that the major axis of one roll 119 will coincide with the minor axes of the two adjacent rolls, during rotation of the several rolls 119.

Each roll 119 is provided with lateral projections adapted to engage ears thrown upwardly in the agitation during the husking operation. As shown, the rolls 119 are provided with lateral brushes 124 adapted to wipe the peripheral surface of the lower rolls 87. The brushes 124 are spaced apart a distance greater than the length of the longest ear fed to the machine.

Secured to the transverse bar 120 at the receiving end of the several husking units is a transversely-extending vertical plate 125 which supports downwardly-inclined delivery chutes 126 arranged at the receiving ends of the several pairs of husking rolls. Each delivery chute is somewhat concave in formation, as shown in Figures 7 and 11 and functions to hold or retard slightly the ears fed end first by the conveyor chains 65 to the husking rolls, thereby causing the forward ends of such ears to fall at a sharp angle to the husking rolls. This causes a prompt feeding of the husks into the bite of the husking rolls.

Above the rolls 119 and co-extensive therewith are longitudinal parallel angle bars 127, the edges of which are adapted to be engaged by the brushes 124 during revolution of the rolls 119 and to free the latter from stray husks and other foreign matter. The inner ends of the bars 127 may be secured to the vertical plate 125 and the outer ends of said bars to the depending vertical arms 121, as shown in Figure 10. The rolls 119 may be driven in unison in the same direction by means of the following drive connections employed for the rolls of each section of the machine: mounted in bearing brackets 128 supported by depending arms 121 is a transverse drive shaft 129 (see Figure 6). Shaft 129 is provided with pinions 130 which mesh with pinions 131 on the upper ends of short vertical shafts 132 journaled in suitable bearings projecting forwardly from the depending arms 121. Pinions 133 on the lower ends of said short shaft 132 mesh with pinions 134 on the outer ends of the several rolls 119 (see Figure 10). Shaft 129 may be driven from the outer shaft 38 of the combined feeding and alining mechanism by the following connections: Fixed to the outer end of shaft 129 is a pinion 135 in mesh with a pinion 136 on an axially-adjustable shaft 137 (see Figures 5 and 6). The lower end of shaft 137 is journaled in bearings carried by a yoke 138 which is pivoted on the shaft 129; the upper end of said shaft is similarly journaled in a yoke 139 pivoted on the shaft 38. Secured to shaft 137 near its upper end is a pinion 140 in mesh with a pinion 141 on the end of shaft 38. With the above set forth construction, the shaft 129 may be raised and lowered in adjusting the elevation of the rectangular frame without disturbing the drive connections. Shaft 137 may conveniently consist of an outer sleeve section having a longitudinal slot 142 and an inner section mounted in the outer sleeve section and provided with a pin 143 projecting laterally in the slot 142. As thus constructed, the two sections may slide axially with respect to each other but are held against relative rotation.

The action of a husking unit constructed in accordance with the invention permits exceedingly rapid husking without clogging or mutilation of the grains and may now be set forth as follows: As the ears are discharged from a conveyor chain 65, they are received by the chute 126 and consequently delivered on to the receiving end of the pair of husking rolls. The butt ends of ears fed tip first by the chain 65 are caught and retarded momentarily by the concave surface of the delivery chute 126, which causes the tip ends of such ears to fall at a sharp angle on the husking rolls, thereby throwing the tip ends of the husks promptly into the bite of the rolls. During the progress of the husking operation a violent agitation is imparted to all the ears deposited on the rolls, the ears being thrown forwardly, side swiped and tumbled about as they are fed along the inclined rolls to the discharge ends thereof. The agitation of the ears prevents slow clogging of the ears. Lagging ears are given violent side shakes by the eccentric surfaces of the rolls. As one of the rolls is in a plane above the other, the agitated ears tend to rest on the lower roll, and the rise and fall motion of the latter, throws the ears up against the upper roll. The upper roll transmits vibratory motion to the ears in less degree than the lower roll and the effect of this is that the ears are spun or revolved on their own axes between the rolls, a motion greatly aiding in the husking operation. The ears are turned over and over in the husking rolls with a sort of a wave-like motion having the effect of a positive impelling force throwing the ears against the constantly varying husking surfaces with an impact greater than that which would be produced by the gravital impact alone of the ears as they fall on the rolls. While I have shown my preferred form of husking units, it will be understood that husking units of other types may be used without departing from the spirit of the invention, as set forth in the appended claims.

As the husking progresses, the ears are kept in alinement by the slowly-rotating roll 119 and the latter also acts to augment the agitation of the ears and assist in keeping them separated. With the two husking rolls 86, 87, the roll 119 forms a long narrow pocket of constantly changing width. Ears are thrown up against the roll 119 and the ends of the ears are caught by the brushes 124 at the same time that the surface of the roll 119 is thrusting the bodies of the ears back against the waving or undulating husking line of the rapidly rotating vibrating surfaces of the rollers 86, 87, thereby causing ears to rest on the husking line and incidentally to throw the tip ends of the ears at one time or another into the bite of the two husking rolls. The spacing of the brushes 124 allows one end only of an ear to be engaged at a time by a brush, and, therefore, the lifting action of the brush will always cause the ear to assume an inclined position with relation to the husking rolls. The brushes 124 as they engage the husks, serve to loosen the same and aid the husking rolls in stripping husks, silk, etc., from the ears. The several rolls 119 also act as partitions keeping ears fed to the several husking units separated from each other.

Husks and silk stripped from the ears, pass in between the rolls 86, 87 of the several husking units, the lower roll 87 being permitted to move slightly away from the upper roll or yield by the yielding bearing construction hereinbefore described. This yielding of the lower roll permits free passage of the waste material and prevents jamming or clogging of the rolls. From the husking rolls, the waste material is discharged on to laterally moving discharge belts constructed and driven as follows: Located beneath each of the husking mechanisms and mounted on transverse spaced supporting bars 149, 150, connecting the bridges 3, are horizontal tables 151 over which move endless belts 152 in the direction of the arrows of Figures 4 and 14. Each belt is made up of side chains 153, connected by slats 154. On one side of the machine, as viewed in Figures 4 and 14, the chains pass over idler sprockets 155 mounted on short shafts 156, the ends of the latter being journaled in bearing brackets 157 secured respectively to the transverse supporting bars 149, 150. Also mounted on the two pairs of bars 149, 150 are bearing brackets 158 positioned in longitudinal alinement relatively to each other and supporting a long drive shaft 159. Shaft 159 is provided with drive sprockets 160 engaging the chains of the two conveyor belts 152. Fixed to shaft 159 is a pinion 161 in mesh with a pinion 162 on a short shaft 163 located centrally between the two conveyor belts. Shaft 163 is journaled in a bracket 164 suspended from the central transverse supporting bar 165, and is provided with a sprocket 166 connected by a chain 167 with a sprocket 168 fixed to the main power shaft 6. By means of the above drive connections, both belts may be driven from the main power shaft 6. If desired the chain 167 may be kept taut by means of an idler sprocket 169 carried by an arm 170 supported on the bar 165 (see dotted lines in Figure 1). It is also desirable to keep the two belts 152 taut and for this purpose vertical bars 171 are suspended from the several brackets 157, 158. Adjustably secured to the said bars 171 are vertical arms 172 carrying idler sprockets 173 engaging the lower reaches of the several chains 153.

A longitudinally-moving conveyor, indicated by the dot-and-dash line of Figure 1, may be positioned beneath the belts 152 for carrying away the waste.

For spraying and washing the ears with water during the husking operation, supply pipe connections are provided which are adapted to cause streams of water to play downwardly on the husking rolls of each husking mechanism. Secured to the side bar 9 is a valve 174 adapted to be connected with any suitable source of supply. Connected to valve 74 are oppositely extending branch pipes 175 for supplying the right and left hand sections of the machine. The pipe connections for each section of the machine are similar in construction and hence only the connections of one section need be described. As shown in Figures 1 and 5, branch pipe 175 is connected by means of a hose 176 with a transverse distributing pipe 177 secured by brackets 178 to the transverse supporting bar 55. Projecting longitudinally from the transverse pipe 177 and connected thereto by pipe joints 178 are spray pipes 179 which extend over the husking units. The forward ends of the spray pipes may be supported by a front-transverse bar 180. Bar 180 is secured at its opposite ends to brackets 181 depending from the side bars 9, as shown in Figure 5. The water is sprayed on the ears during the husking thereof and in sufficient quantities to entirely moisten and soften the husks. Prior to my invention, devices have been employed for spraying the husking rolls. By my improved husking rolls wherein the ears are tumbled about and the rolls are constructed so as to more firmly grip the husks, I am able to strip the husks from the ears although they are wet and the wetting of the ear greatly facilitates the clean stripping of the husk from the ear and the ears therefore, are delivered from the machine thoroughly stripped of husks and silk and washed.

It is obvious that changes in the arrangement of the parts and the details of construction may be made without departing from the spirit of the invention as set forth in the appended claims.

Having thus described my invention, what I claim as new and desire to secure by Letters Patent, is:—

1. A corn husking machine comprising a plurality of husking units, a plurality of ear alining pockets from which the ears are fed to the respective husking units in endwise position, feeding mechanism adapted to receive unalined ears for advancing the ears to and depositing them in said pockets, and movable means for freely distributing the ears transversely over the feeding mechanism.

2. A corn husking machine comprising a plurality of husking units, a plurality of ear alining pockets from which the ears are fed to the husking units in endwise position, and feeding mechanism for advancing the ears to said pockets, including means for arranging in endwise position during the feed thereof ears deposited indiscriminately on said feeding mechanism, and movable means for distributing the ears transversely over the feeding mechanism.

3. A corn husking machine comprising a husking unit, an ear alining pocket from which the ears are fed to the husking unit in endwise position, and feeding mechanism for advancing the ears to and depositing them in said pocket, including movable means for arranging in endwise position during the feed thereof ears deposited indiscriminately on said feeding mechanism, and movable means located adjacent the mouth of the alining pocket and engageable with the ears for assisting in alining the ears.

4. A corn husking machine comprising a plurality of husking units, a plurality of ear alining pockets from which the ears are fed to the husking units in endwise position, and feeding mechanism for advancing the ears to and depositing them in said pockets, including means for arranging in endwise position during the feed thereof ears deposited indiscriminately on said feeding mechanism, means for distributing the ears transversely over the feeding mechanism and means located adjacent the mouths of the alining pockets and engageable with the ears for assisting in alining the ears.

5. A corn husking machine comprising a plurality of husking units, a plurality of ear alining pockets, a combined ear feeding and alining mechanism for depositing the ears in said pockets, said combined mechanism receiving ears deposited thereupon indiscriminately and including means for arranging the ears in endwise position during the feed thereof, and means for advancing the ears in endwise position from the pockets to the husking units.

6. A corn husking machine comprising a plurality of husking units, a plurality of ear alining pockets, a plurality of feeding and alining mechanisms receiving ears deposited thereupon indiscriminately and for feeding the ears to said pockets, said mechanisms including means for advancing the ears and for arranging them in endwise position during the feed thereof and means for distributing the ears transversely over the combined mechanisms and means for advancing the ears in endwise position from the pockets to the husking units.

7. A corn husking machine comprising a plurality of husking units, a plurality of ear alining pockets, a plurality of feeding and alining mechanisms receiving ears deposited thereupon indiscriminately and for feeding the ears to said pockets, means disposed at the mouth of each pocket for arranging the ears in endwise position as the latter fall in the pockets, and means for advancing the ears in endwise position from the pockets to the husking units.

8. A corn husking machine comprising a pair of inclined husking elements for stripping the ears as said ears move endwise along said elements, a pocket at one end of the husking elements receiving the ears arranged in endwise position and from which the ears are fed to the husking elements, feeding mechanism for advancing the ears to said pocket including means for arranging the ears in endwise position during the feed thereof, and means located adjacent the mouth of the pocket and engageable with the ears as they fall into the pocket for assisting in alining the same.

9. A corn husking machine comprising a plurality of husking units along which the ears pass in endwise position for husking, a plurality of ear alining pockets partitioned from each other and from which the ears are fed to the husking units in endwise position, a combined feeding and alining mechanism, receiving ears deposited thereupon indiscriminately and for feeding ears to said pockets, said combined mechanism including means for advancing the ears and for arranging them in endwise position during the feed thereof and means for feeding the ears from the pockets to the husking units.

10. A corn husking machine comprising a plurality of husking units, a plurality of ear alining pockets from which the ears are fed to the husking units in endwise position, a combined feeding and alining mechanism, receiving ears deposited thereupon indiscriminately and for feeding said ears to said pockets, said combined mechanism embodying a plurality of longitudinally movable conveyor belts having their discharge ends positioned above the mouths of the pockets, each conveyor belt being provided with a row of spaced ear engaging members, the ear engaging members of one belt being arranged intermediate the ear engaging members of the adjacent belt.

11. A corn husking machine comprising a plurality of husking units, a plurality of ear alining pockets from which the ears are fed to the husking units in endwise position, a combined feeding and alining mechanism receiving ears deposited thereupon indiscriminately and for feeding the ears to said pockets, said combined mechanism embodying a plurality of longitudinally movable conveyor belts for advancing the ears to and depositing them in the mouths of said pockets, each conveyor belt being provided with a row of spaced ear engaging fingers projecting vertically, the fingers of one belt being arranged intermediate the fingers of the adjacent belt, and rotatable shafts interposed between adjacent belts for moving the ears transversely across the belts to effect uniform distribution over the several belts.

12. A corn husking machine comprising a plurality of husking units, a plurality of ear alining pockets from which the ears are fed to the husking units in endwise position, a combined feeding and alining mechanism receiving ears deposited thereupon indiscriminately and for feeding the ears to said pockets, said combined mechanism embodying a plurality of longitudinally movable conveyor belts for advancing the ears to and depositing them in the mouths of said pockets, each conveyor belt being provided with a row of spaced ear engaging fingers projecting from the belts, and the fingers of one belt being arranged intermediate the fingers of the adjacent belt, and moving members interposed between adjacent belts for causing said ears to travel transversely across the belts to effect uniform distribution over the several belts.

13. A corn husking machine comprising a plurality of husking units, a plurality of ear alining pockets from which the ears are fed to the husking units in endwise position, a combined feeding and alining mechanism receiving ears deposited thereupon indiscriminately and for feeding the ears to said pockets, said combined mechanism embodying a plurality of longitudinally movable conveyor belts for advancing the ears to and depositing them in the mouths of said pockets, each conveyor belt being provided with a row of spaced ear engaging members, arranged intermediate the ear engaging members of an adjacent belt, and rotating members interposed between adjacent belts for causing said ears to travel transversely across the belts to effect uniform distribution over the several belts.

14. A corn husking machine comprising a plurality of husking units, a plurality of ear alining pockets from which the ears are fed to the husking units in endwise position, a horizontal feed table, a plurality of conveyor belts movable longitudinally over said table for advancing the ears to and depositing them in the mouths of said pockets, each conveyor belt being provided with a row of spaced ear engaging members arranged intermediate the ear engaging members of an adjacent belt and means intermediate the conveyor belts for distributing the ears over the feed table.

15. A corn husking machine comprising a plurality of husking units, a plurality of ear alining pockets from which the ears are fed to the husking units in endwise position, a horizontal feed table, a plurality of belts movable longitudinally over said table for advancing the ears to and depositing them in the mouths of said pockets, each conveyor belt being provided with a row of spaced ear engaging members arranged intermediate the ear engaging members of an adjacent bolt, and rollers interposed between adjacent belts and rotating on longitudinal axes in directions away from the central longitudinal axis of the table.

16. A corn husking machine comprising a plurality of husking units, a plurality of ear alining pockets from which the ears are fed to the husking units in endwise position, a combined feeding and alining mechanism receiving ears deposited thereupon indiscriminately and for feeding the ears to said pockets, said combined mechanism embodying a plurality of longitudinally movable conveyor belts for advancing the ears to and depositing them in the mouths of said pockets, members interposed between adjacent belts and rotating on axes parallel with the line of progression of the belts, spaced transverse plate members mounted on the belts extending beneath said members, and ear engaging fingers mounted on said plate members and projecting upwardly therefrom.

17. A corn husking machine comprising a plurality of husking units, a plurality of ear alining pockets from which the ears are fed to the husking units in endwise position, a combined feeding and alining mechanism receiving ears deposited thereupon indiscriminately and for feeding the ears to said pockets, said combined mechanism embodying a plurality of longitudinally movable conveyor belts for advancing the ears to and depositing them in the mouths of said pockets, members interposed between adjacent belts and rotating on axes parallel with the line of progression of the belt for imparting an impetus to ears transversely of the belts to effect uniform distribution over the several belts, means carried by the rotating members and positioned to engage ears deposited by the belts in the mouths of the pocket for assisting in alining the same.

18. A combined feeding and alining mechanism for machines handling ears of corn and presenting the same to an operating mechanism including a plurality of ear alining pockets, feeding mechanism for advancing the ears to said pockets, said feeding mechanism having means for arranging in endwise position during the feed thereof ears deposited indiscriminately on said feeding mechanism, and means for distributing the ears transversely over the feeding mechanism.

19. A combined feeding and alining mechanism for machines handling ears of corn and presenting the same to an operating mechanism, including a plurality of ear alining pockets, feeding mechanism for advancing the ears to and depositing them in said pockets, said feeding mechanism having means for arranging in endwise position during the feed thereof, ears deposited indiscriminately on said feeding mechanism, and means located adjacent the mouths of the alining pockets and engageable with the ears as they fall into the pockets, for assisting in alining the ears.

20. A green corn husking machine comprising co-acting rotating husking rolls, said rolls being inclined downwardly from end to end thereof for causing the ears to travel along the same as they are being husked, and a rotating member located above and at the side of said husking rolls, said rotating member being non-circular in cross section.

21. A green corn husking machine comprising co-acting rotating husking rolls, said rolls being inclined downwardly from end to end thereof for causing the ears to travel along the same as they are being husked, and a rotating member located above and at the side of said husking rolls, said rotating member having brushes thereon.

22. A green corn husking machine comprising co-acting rotating husking rolls, said rolls being inclined downwardly from end to end thereof for causing the ears to travel along the same as they are being husked, and a rotating member located above and at the side of said husking rolls, said rotating member being elliptical in cross section.

23. A green corn husking machine comprising co-acting rotating husking rolls, said rolls being inclined downwardly from end to end thereof for causing the ears to travel along the same as they are being husked, means for feeding the ears in an endwise position to the husking rolls at one end thereof and rotating members located above and at the sides of said rolls for guiding the ears along the husking rolls.

24. A corn husking machine comprising co-acting rotating husking rolls, said rolls being inclined downwardly from end to end thereof for causing the ears to travel along the same as they are being husked, means for feeding the ears in an endwise position to the husking rolls at one end thereof and rotating members located above and at the sides of said rolls for guiding the ears along the husking rolls, said rotating members having projecting devices for engaging the ears and said projecting devices being spaced at a distance greater than the length of the longest ears.

25. A corn husking machine comprising a pair of co-acting rotating husking rolls constructed so as to produce a sidewise shifting and a tumbling of the ears as they are being husked, and rotating members located at each side of the husking rolls, said rotating members being elliptical in cross section to assist in shifting the ears about on the husking rolls.

26. A corn husking machine comprising a plurality of adjacent husking units, a plurality of adjacent ear receiving pockets for directing the ears to the husking units, and movable devices above and adjacent the mouth of the pockets and engageable with the ears for insuring that the ears will drop into the pockets without clogging.

27. A corn husking machine comprising a husking unit, an ear receiving pocket for directing the ears to the husking unit, a revolving blade at each side of said ear receiving pocket and adjacent the mouth thereof for engaging the ears and insuring that the ears pass into the pockets without clogging.

In testimony whereof, I affix my signature in the presence of two witnesses.

WILLIAM HAMMOND LEISTER.

Witnesses:
 RALPH COVER,
 EDWARD O. WEAVER.